United States Patent [19]

Takahashi et al.

[11] Patent Number: 5,411,449
[45] Date of Patent: May 2, 1995

[54] GEAR SHIFT CONTROL APPARATUS

[75] Inventors: Hiroshi Takahashi, Komae; Shinsuke Sakaue, Yokosuka, all of Japan

[73] Assignee: Nissan Motor Co., Ltd., Yokohama, Japan

[21] Appl. No.: 128,777

[22] Filed: Sep. 30, 1993

[30] Foreign Application Priority Data

Oct. 2, 1992 [JP] Japan .................... 4-264674

[51] Int. Cl.$^6$ ............................ F16H 59/24
[52] U.S. Cl. ...................... 477/120; 477/905
[58] Field of Search ............ 477/120, 904, 905

[56] References Cited

U.S. PATENT DOCUMENTS

| | | | |
|---|---|---|---|
| 4,727,771 | 3/1988 | Niwa et al. | 477/48 |
| 4,747,807 | 5/1988 | Nakamura et al. | 474/28 |
| 4,841,815 | 6/1989 | Takahashi | 364/424.1 |
| 4,853,673 | 8/1989 | Kido et al. | 340/439 |
| 4,976,170 | 12/1990 | Hayashi et al. | 477/48 |
| 4,996,893 | 3/1991 | Nakamura et al. | 477/125 |
| 5,040,114 | 8/1991 | Ishikawa et al. | 364/424.1 |
| 5,129,288 | 7/1992 | Sasaki et al. | 364/424.1 |
| 5,163,702 | 11/1992 | Wood et al. | 280/703 |
| 5,233,523 | 8/1993 | Follmer | 364/424.1 |
| 5,341,703 | 8/1994 | Palamsky et al. | 477/65 |

FOREIGN PATENT DOCUMENTS 60-175858  9/1985  Japan .

*Primary Examiner*—Dirk Wright
*Attorney, Agent, or Firm*—Foley & Lardner

[57] ABSTRACT

A gear shift control apparatus for use with an automotive vehicle to control gear shift operation in the automatic transmission. An estimated engine load is calculated as a function of engine load and engine load rate of change to reflect a driver's expectation for gear shift operation on the gear shift control. A shift pattern is used to select an appropriate gear position based upon the vehicle speed and the estimated engine load.

9 Claims, 16 Drawing Sheets

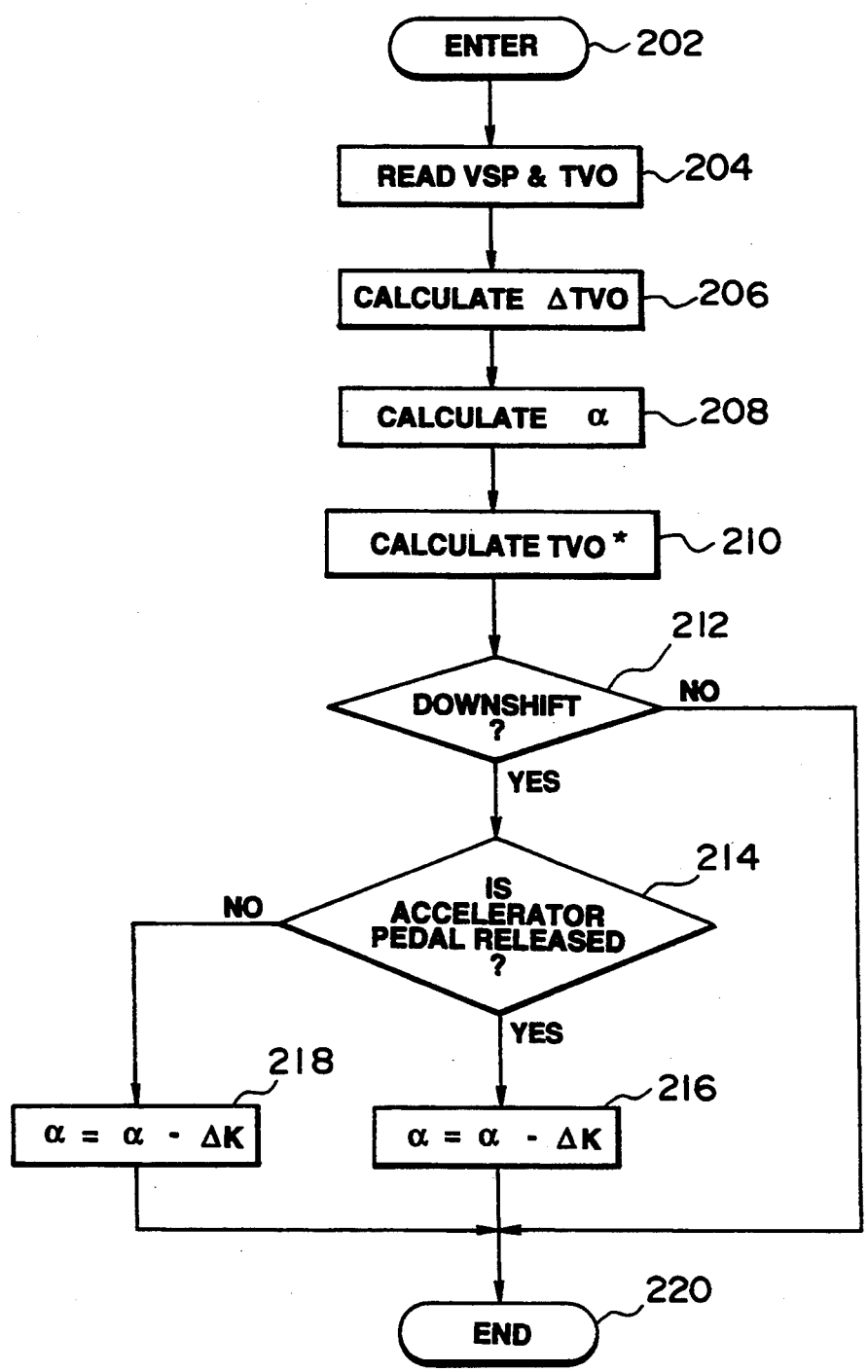

GEAR SHIFT CONTROL APPARATUS

BACKGROUND OF THE INVENTION

This invention relates to a gear shift control apparatus for use with an automotive vehicle to control gear shift operation in the automatic transmission.

It is the conventional practice to perform gear shift control with the use of a shift pattern which specifies an appropriate gear position as a function of vehicle speed and throttle angle. With such a conventional gear shift control, however, it is difficult to reflect the driver's intention for gear shift operation on the gear shift control in fast response. It is now assumed that the driver expects a gear shift operation and depresses the accelerator pedal. If the degree of depression of the accelerator pedal is somewhat insufficient for the operation point specified by the sensed engine speed and throttle angle to cross the corresponding one of the gear shift lines of the shift pattern, no gear shift operation is made in the automatic transmission. Thus, the driver is required to depress the accelerator pedal again.

SUMMARY OF THE INVENTION

It is a main object of the invention to provide a gear shift control apparatus which can make a gear shift operation in fast response to a driver's expectation for gear shift operation.

There is provided, in accordance with the invention, a gear shift control apparatus for use with an automotive vehicle having an engine and an automatic transmission to control gear shift operation in the automatic transmission. The gear shift control apparatus comprises a vehicle speed sensor sensitive to vehicle speed for producing a first sensor signal indicative of a sensed vehicle speed, an engine load sensor sensitive to engine load for producing a second sensor signal indicative of a sensed engine load, means responsive to the second sensor signal for calculating a rate of change of the engine load, means for calculating an estimated engine load as a function of the sensed engine load and the calculated engine load rate of change to reflect a driver's expectation for gear shift operation on the gear shift control, and means for selecting a gear position based upon the sensed vehicle speed and the estimated engine load.

In another aspect of the invention, the gear shift control apparatus comprises a vehicle speed sensor sensitive to vehicle speed for producing a first sensor signal indicative of a sensed vehicle speed, an engine load sensor sensitive to engine load for producing a second sensor signal indicative of a sensed engine load, means responsive to the second sensor signal for calculating a rate of change of the engine load, means for calculating an acceleration of change of the engine load, means for producing a command signal indicative of a driver's expectation for gear shift operation when the sensed engine load is in a first range specified therefor, the calculated rate of change of the engine load is in a second range specified therefor, and the calculated acceleration of change of the engine load is in a third range specified therefor, and control means using a shift pattern to select a gear position based upon the sensed vehicle speed and engine load in the absence of the command signal. The control means is responsive to the command signal for selecting a gear position indicated by the command signal.

In another aspect of the invention, the gear shift control apparatus comprises a vehicle speed sensor sensitive to vehicle speed for producing a first sensor signal indicative of a sensed vehicle speed, an engine load sensor sensitive to engine load for producing a second sensor signal indicative of a sensed engine load, means responsive to the second sensor signal for calculating a rate of change of the engine load, means for producing a detection signal when an interrupt is detected in accelerator pedal depressing or releasing operation based upon the calculated engine load rate of change, means responsive to the detection signal for producing a command signal when a distance of a position specified by sensed vehicle speed and vehicle load on a shift pattern from a gear shift line is in a predetermined range, and control means using the shift pattern to select a gear position based upon the sensed vehicle speed and engine load in the absence of the command signal. The control means is responsive to the command signal for selecting a gear position indicated by the command signal.

In still another aspect of the invention, the gear shift control apparatus comprises a vehicle speed sensor sensitive to vehicle speed for producing a first sensor signal indicative of a sensed vehicle speed, an engine load sensor sensitive to engine load for producing a second sensor signal indicative of a sensed engine load, means responsive to the second sensor signal for calculating a rate of change of the engine load, means for calculating an acceleration of change of the engine load, means for producing a first detection signal when the sensed engine load is in a first range specified therefor, the calculated rate of change of the engine load is in a second range specified therefor, and the calculated acceleration of change of the engine load is in a third range specified therefor, means for producing a second detection signal when an interrupt is detected in accelerator pedal depressing or releasing operation based upon the calculated engine load rate of change, means responsive to the second detection signal for producing a third detection signal when a distance of a position specified by sensed vehicle speed and vehicle load on a shift pattern from a gear shift line is in a predetermined range, means for producing a command signal in the presence of the first and third detection signals, and control means using a shift pattern to select a gear position based upon the sensed vehicle speed and engine load in the absence of the command signal. The control means is responsive to the command signal for selecting a gear position indicated by the command signal.

BRIEF DESCRIPTION OF THE DRAWINGS

This invention will be described in greater detail by reference to the following description taken in connection with the accompanying drawings, in which:

FIG. 6 is a flow diagram illustrating the programming of the digital computer used in the control unit of FIG. 1;

DETAILED DESCRIPTION OF THE INVENTION

Figure 1:
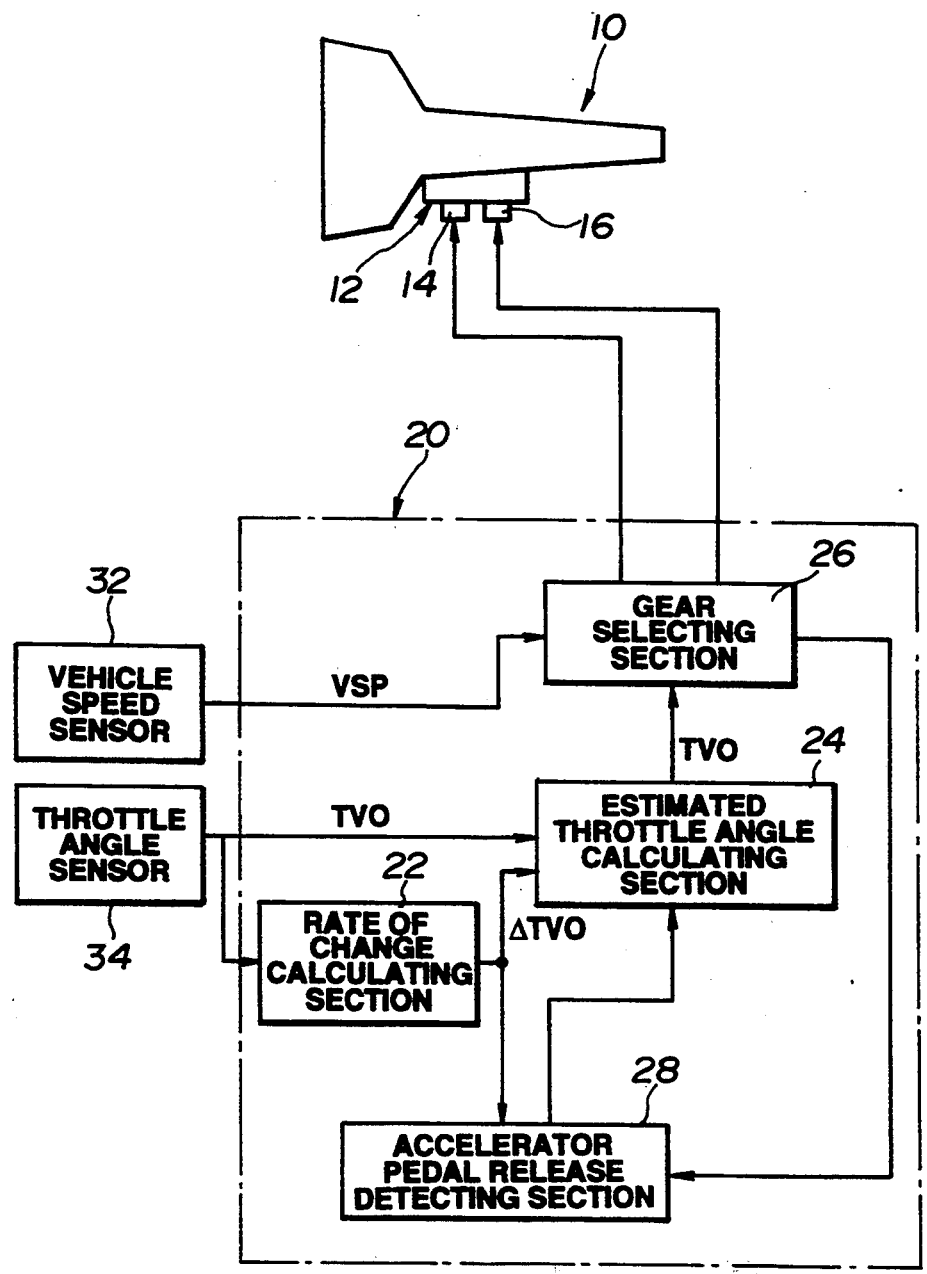
FIG. 1 is a schematic diagram showing one embodiment of an automatic transmission apparatus made in accordance with the invention.

With reference to the drawings, and in particular to FIG. 1, there is shown a schematic diagram of an automatic transmission apparatus embodying the invention. The automatic transmission apparatus is intended for use with an automotive vehicle including an internal combustion engine drivingly connected to an automatic transmission 10. The automatic transmission 10 includes a control valve unit 12 having shift solenoids 14 and 16 operable for gear shift control on command from an automatic transmission (AT) control unit 20.

The gear shift control is made based upon vehicle operating conditions including vehicle speed, throttle angle which controls the amount of air supplied to the engine, and throttle angle rate of change. Thus, a vehicle speed sensor 32 and a throttle angle sensor 34 are connected to the control unit 20. The vehicle speed sensor 32 produces an electrical signal indicative of the speed of travelling of the vehicle. The throttle angle sensor 34 produces an electrical signal indicative of the angle TVO of rotation of the throttle valve situated within the engine intake passage for controlling the amount of air permitted to enter the engine. In this invention, the engine load is inferred from the sensed throttle angle TVO. The throttle valve is connected by a mechanical linkage to an accelerator pedal (not shown). The degree to which the accelerator pedal is depressed controls the degree of rotation of the throttle valve.

Figure 2:
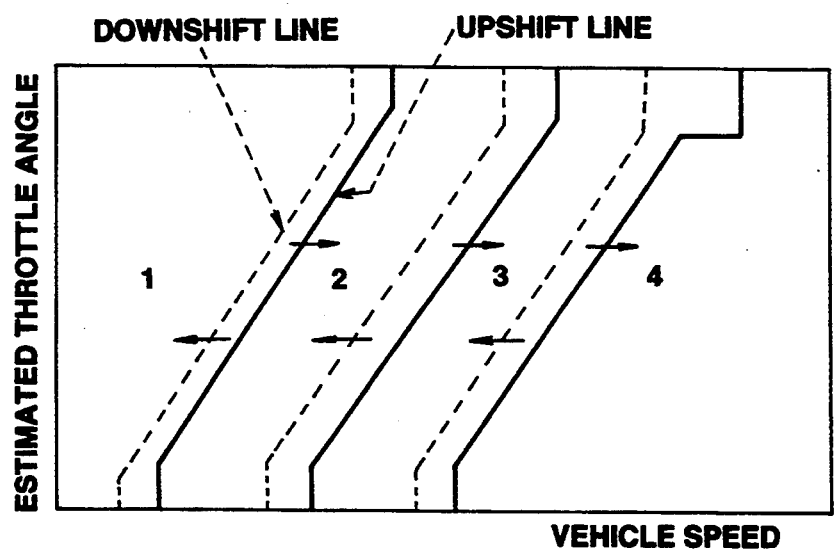
FIG. 2 is a graph of vehicle speed versus estimated throttle angle.

The control unit 20 includes a throttle angle rate of change calculating section 22, an estimated throttle angle calculating section 24, a gear selecting section 26, and an accelerator pedal release detecting section 28. The throttle angle rate of change calculating section 22 receives information on the throttle angle from the throttle angle sensor 34 and it calculates a throttle angle rate of change $\Delta TVO$ (throttle angle change per unit time). The estimated throttle angle calculating section 24 receives information on the throttle angle from the throttle angle sensor 34 and also information on the throttle angle rate of change $\Delta TVO$ from the throttle angle rate of change calculating section 22 and it calculate an estimated throttle angle $TVO^*$ to realize a driver's expectation for gear shift operation. The gear selecting section 26 receives information on the vehicle speed from the vehicle speed sensor 32 and also information on the estimated throttle angle $TVO^*$ from the estimated throttle angle calculating section 24 and it produces a command signal to shift the gear position. For this purpose, the gear selecting section 26 has a specified shift pattern which defines a gear position to be selected as a function of vehicle speed and estimated throttle angle, as shown in FIG. 2. In FIG. 2, the solid lines indicate up-shift lines and the broken lines indicate down-shift lines. The gear selecting section 26 produces a trigger signal when it produces the command signal. The trigger signal is fed to a accelerator pedal release detecting section 28 which also receives information on the throttle angle rate of change $\Delta TVO$. The accelerator pedal release detecting section 28 is operable, in response to the trigger signal, to detect the fact that the driver releases the accelerator pedal based upon the information on the throttle angle rate of change $\Delta TVO$. When the accelerator pedal release detecting section 28 detects the accelerator pedal release, it produce a parameter correction signal to the estimated throttle angle calculating section 24.

Figure 3A:
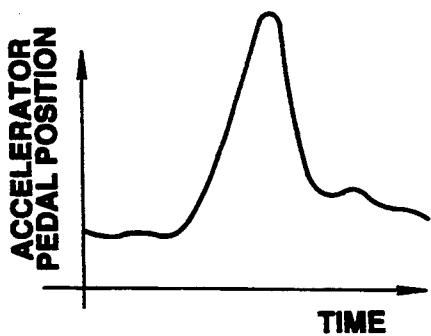
FIGS. 3A and 3B are graphs of time versus accelerator pedal position.
Figure 3B:
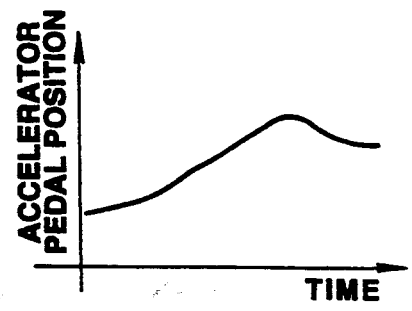
Figure 4A:
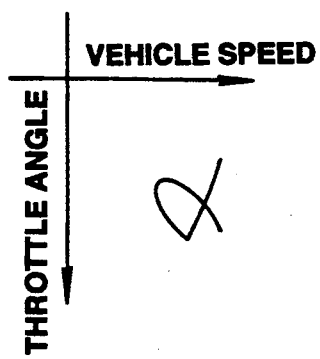
FIG. 4A is a graph of vehicle speed versus throttle angle.
Figure 4B:
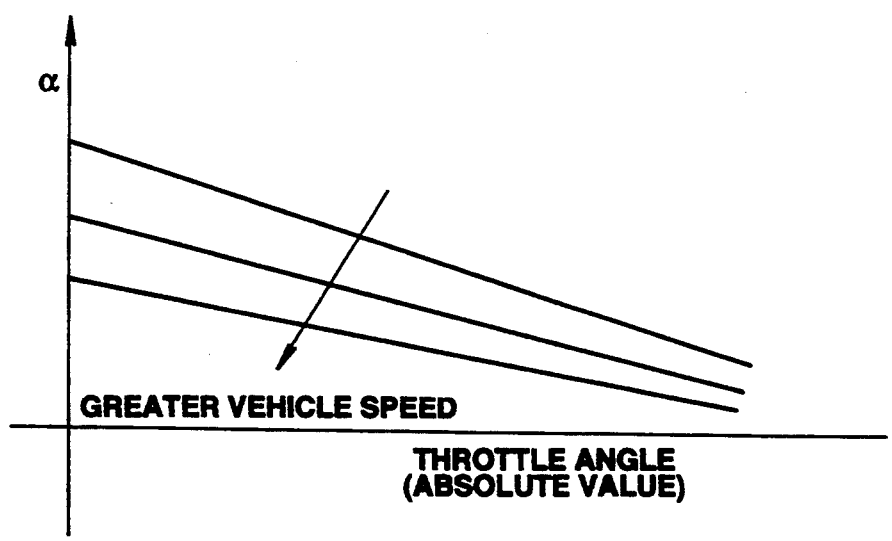
FIG. 4B is a graph of throttle angle versus factor.

FIG. 3A shows a pattern produced when the driver's intention for acceleration is strong, whereas FIG. 3B shows another pattern produced when the driver's intention for acceleration is not strong. It can be seen from a comparison of FIGS. 3A and 3B that the strength of the driver's intention for acceleration may be indicated by the throttle angle rate of change $\Delta TVO$ which corresponds to the rate of change of the accelerator pedal position. If the gear shift operation is made merely based upon the rate of change of the accelerator pedal position, however, the driver's demand for acceleration is not satisfied in fast response to an accelerator pedal depression. In this embodiment, the estimated throttle angle calculating section 24 is arranged to calculate the estimated throttle angle $TVO^*$ as $$TVO^* = TVO + \alpha \cdot \Delta TVO$$

where $\alpha$ is a factor calculated as a function of the vehicle speed VSP and the absolute value of the throttle angle TVO. In practice, the factor $\alpha$ may be calculated from a relationship which specifies the factor $\alpha$ as a function of vehicle speed VSP and throttle angle TVO, as shown in FIG. 4A. This relationship is prepared in such a manner that the factor $\alpha$ decreases as the absolute value of the vehicle speed VSP increases and it decreases as the absolute value of the throttle angle TVO increases, as shown in FIG. 4B. The used vehicle speed and throttle angle values VSP and TVO are sampled at the start of depression of the accelerator pedal.

Figure 5A:
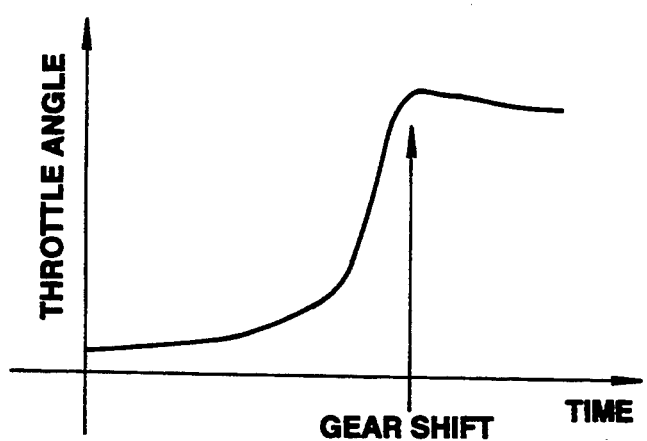
FIGS. 5A and 5B are graphs of time versus throttle angle.
Figure 5B:
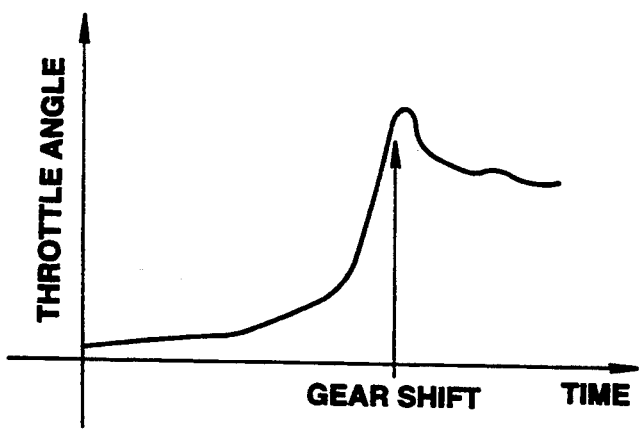

The factor $\alpha$ is converged to an optimum value to bring the gear shift control into conformance with the driver's habitual accelerator pedal operation practice. For this purpose, the accelerator pedal release detecting section 28 is arranged to monitor the driver's accelerator pedal operation. The driver will not release the accelerator pedal to a great extent, as shown in FIG. 5A, when a driver's accelerator pedal depression causes a gear shift operation to satisfy the driver's intention, whereas the driver will release the accelerator pedal to a great extent, as shown in FIG. 5B, when a driver's accelerator pedal depression causes a down-shift operation against the driver's intention. It can be seen from a comparison of FIGS. 5A and 5B that the driver will release the accelerator pedal to a small extent when a driver's expectation for a down-shift operation is satisfied and to a great extent when a gear shift operation in spite of no driver's expectation for the gear shift operation. The accelerator pedal release detecting section 28 is responsive to the trigger signal fed thereto from the gear selecting section 26 to produces a parameter correction signal causing the estimated throttle angle calculating section 24 to modify the factor $\alpha$ to a smaller value ($\alpha - \Delta k$) when the degree to which the accelerator pedal is released to a great extent and to a greater value ($\alpha + \Delta k$) when the degree to which the accelerator pedal is released is small. This is effective to realize gear shift operations conforming to the driver's habitual accelerator pedal operation practice. In this case, the initial value of the factor $\alpha$ may be set at a desired value.

The control unit 20 may employ a digital computer which includes a central processing unit (CPU), a random access memory (RAM), a read only memory (ROM), and an input/output control unit (I/O). The central processing unit communicates with the rest of the computer via data bus. The input/output control circuit includes an analog-to-digital converter which converts the analog signal received from the sensors into digital form for application to the central processing unit. The read only memory contains the program for operating the central processing unit and further contains appropriate data in look-up tables used in calculating an appropriate value for the factor $\alpha$. The look-up data may be obtained experimentally or derived empirically.

FIG. 6 is a flow diagram illustrating the programming of the digital computer used in the control unit of FIG. 1. The computer program is entered at the point 202 at uniform intervals of time. At the point 204 in the program, the vehicle speed VSP and the throttle angle TVO are read into the computer memory. At the point 206 in the program, the central processing unit calculates the rate $\Delta TVO$ of change of the throttle angle based upon the read throttle angle TVO by subtracting the last throttle angle value from the new throttle angle value. At the point 208 in the program, the factor $\alpha$ is calculated from a relationship programmed into the computer. This relationship specifies the factor $\alpha$ as a function of vehicle speed VSP and throttle angle TVO, as described in connection with FIG. 4A and 4B. At the point 210 in the program, the central processing unit calculates an estimated throttle angle TVO* as $TVO^* = TVO + \alpha \cdot \Delta TVO$ where TVO is the read throttle angle, $\alpha$ is the calculated factor and $\Delta TVO$ is the calculated throttle angle rate of change.

At the point 212 in the program, a determination is made as to whether or not a down-shift operation is made. This determination is made from the shift pattern of FIG. 2 with reference to the position specified by the vehicle speed VSP and the estimated throttle angle TVO*. If the answer to this question is "yes", then the program proceeds to the point 214. Otherwise, the program proceeds to the end point 220.

At the point 214 in the program, a determination is made as to whether or not the degree to which the accelerator pedal is released exceeds a predetermined value just after the gear shift operation is made. This determination may be made based upon the read throttle angle rate of change $\Delta TVO$. If the answer to this question is "yes" (or the throttle angle rate of change $\Delta TVO$ exceeds a predetermined value), then it means that the driver expect no gear shift operation and the program proceeds to the point 216 where the factor $\alpha$ is modified to a smaller value ($\alpha - \Delta k$). Following this, the program proceeds to the end point 220. If the degree to which the accelerator pedal is released is less than the predetermined value, then the program proceeds to the point 218 where the factor $\alpha$ is modified to a greater value ($\alpha + \Delta k$). Following this, the program proceeds to the end point 220. The modified factor $\alpha$ is used to calculate the estimated throttle angle value which are used, along with the vehicle speed, to produce a command signal causing the control valve unit 12 to make a gear shift operation.

In this embodiment, an estimated throttle angle TVO* is calculated as a function of throttle angle TVO and throttle angle rate of change $\Delta TVO$ to reflect a driver's expectation for gear shift operation on the gear shift control. The estimated throttle angle TVO* is engine load information which is used, along with vehicle speed information, for gear shift control. It is, therefore, possible to make a gear shift operation in fast response to a driver's expectation for gear shift operation. Furthermore, the factor $\alpha$, which is used to calculate the estimated throttle angle TVO*, is modified according to driver's accelerator pedal operations. It is, therefore, possible to realize an optimum gear shift operation conforming to the driver's habitual accelerator pedal operation practice.

Figure 7:
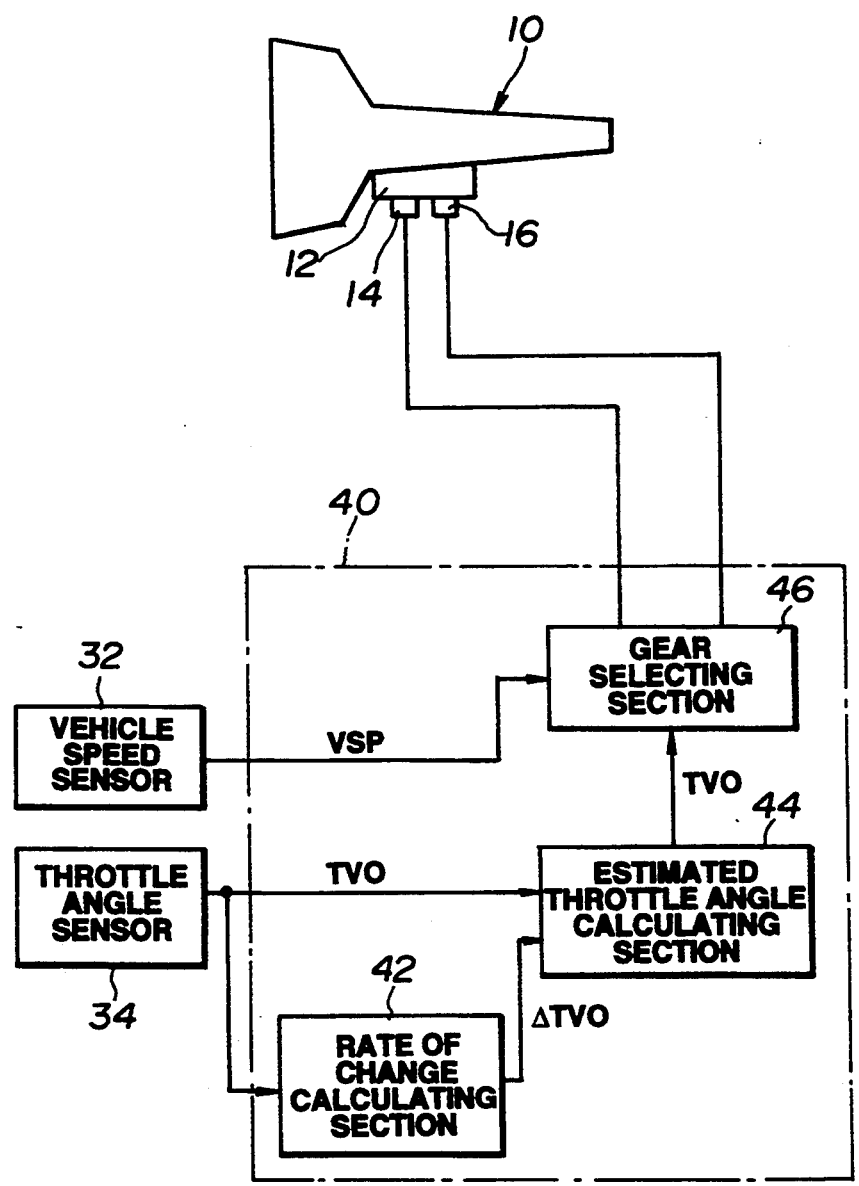
FIG. 7 is a schematic diagram showing a second embodiment of the automatic transmission apparatus of the invention.

Referring to FIG. 7, there is shown a second embodiment of the automatic transmission apparatus of the invention. The automatic transmission apparatus is intended for use with an automotive vehicle including an internal combustion engine drivingly connected to an automatic transmission 10. The automatic transmission 10 includes a control valve unit 12 having shift solenoids 14 and 16 operable for gear shift control on command from an automatic transmission (AT) control unit 40.

The gear shift control is made based upon vehicle operating conditions including vehicle speed, throttle angle which controls the amount of air supplied to the engine, and throttle angle rate of change. Thus, a vehicle speed sensor 32 and a throttle angle sensor 34 are connected to the control unit 40. The vehicle speed sensor 32 produces an electrical signal indicative of the speed of travelling of the vehicle. The throttle angle sensor 34 produces an electrical signal indicative of the angle TVO of rotation of the throttle valve situated within the engine intake passage for controlling the amount of air permitted to enter the engine. In this invention, the engine load is inferred from the sensed throttle angle TVO. The throttle valve is connected by a mechanical linkage to an accelerator pedal (not shown). The degree to which the accelerator pedal is depressed controls the degree of rotation of the throttle valve.

The control unit 40 includes a throttle angle rate of change calculating section 42, an estimated throttle angle calculating section 44, and a gear selecting section 46. The throttle angle rate of change calculating section 42 receives information on the throttle angle from the throttle angle sensor 34 and it calculates a throttle angle rate of change ΔTVO (throttle angle change per unit time). The estimated throttle angle calculating section 44 receives information on the throttle angle TVO from the throttle angle sensor 34 and also information on the throttle angle rate of change ΔTVO from the throttle angle rate of change calculating section 42 and it calculate an estimated throttle angle TVO* to realize a driver's expectation for gear shift operation. The gear selecting section 26 receives information on the vehicle speed from the vehicle speed sensor 32 and also information on the estimated throttle angle TVO* from the estimated throttle angle calculating section 44 and it produces a command signal to shift the gear position. For this purpose, the gear selecting section 26 has a specified shift pattern which defines a gear position to be selected as a function of vehicle speed and estimated throttle angle, as shown in FIG. 2. In FIG. 2, the solid lines indicate up-shift lines and the broken lines indicate down-shift lines.

Figure 8:
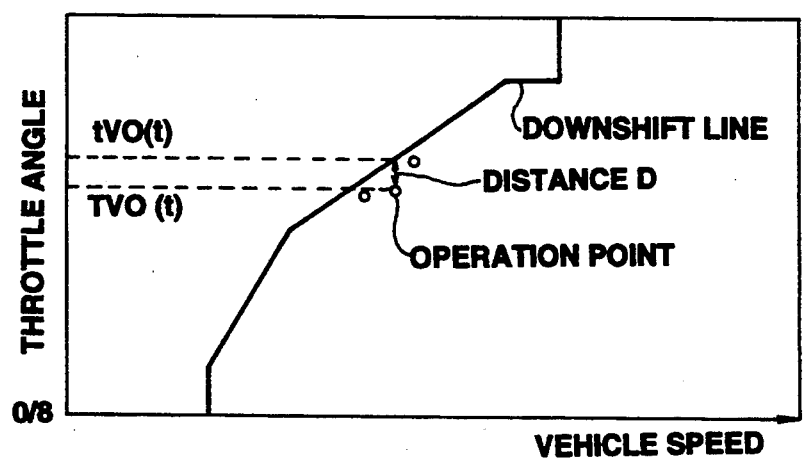
FIG. 8 is a graph of vehicle speed versus throttle angle.
Figure 9:
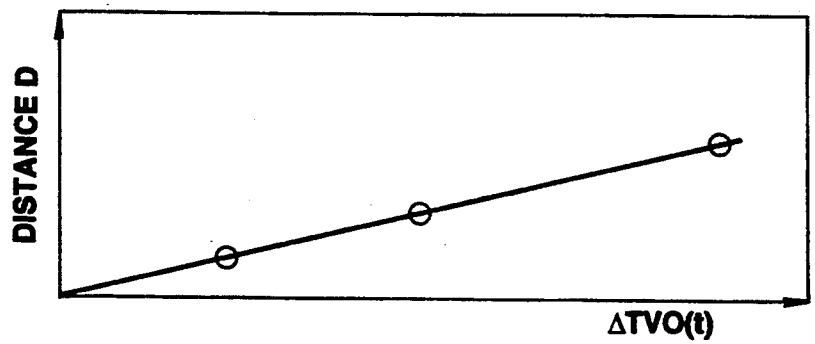
FIG. 9 is a graph of throttle angle difference versus difference.

The estimated throttle angle calculating section 44 is arranged to calculate the estimated throttle angle TVO* as $$TVO^* = TVO + \alpha \cdot \Delta TVO$$

where $\alpha$ is a factor calculated as a function of the vehicle speed VSP and the absolute value of the throttle angle TVO. The estimated throttle angle calculating section 44 calculates a difference ΔTVO(t) between the throttle angle TVO sensed at the present time when the driver expects a gear shift operation and the throttle angle TVO(t−Δ) sensed a predetermined time before the present time at the present time, a throttle angle tVO(t) specified by the down-shift line with respect to the vehicle speed VSP(t) sensed at the present time, and a distance D (=tVO(t)−TVOt) between the throttle angle tVO(t) and the throttle angle TVO(t), as shown in FIG. 8. These calculations are repeated at uniform intervals of time. The points specified by the coordinates (ΔTVO, D) are plotted to create an approximated line extending the origin, as shown in FIG. 9. The estimated throttle angle calculating section 44 sets the factor $\alpha$ at a value equal to the slope of the approximated line.

The control unit 40 may employ a digital computer which includes a central processing unit (CPU), a random access memory (RAM), a read only memory (ROM), and an input/output control unit (I/O). The central processing unit communicates with the rest of the computer via data bus. The input/output control circuit includes an analog-to-digital converter which converts the analog signal received from the sensors into digital form for application to the central processing unit. The read only memory contains the program for operating the central processing unit and further contains appropriate data used in calculating the factor $\alpha$. The data may be obtained experimentally or derived empirically.

Figure 10:
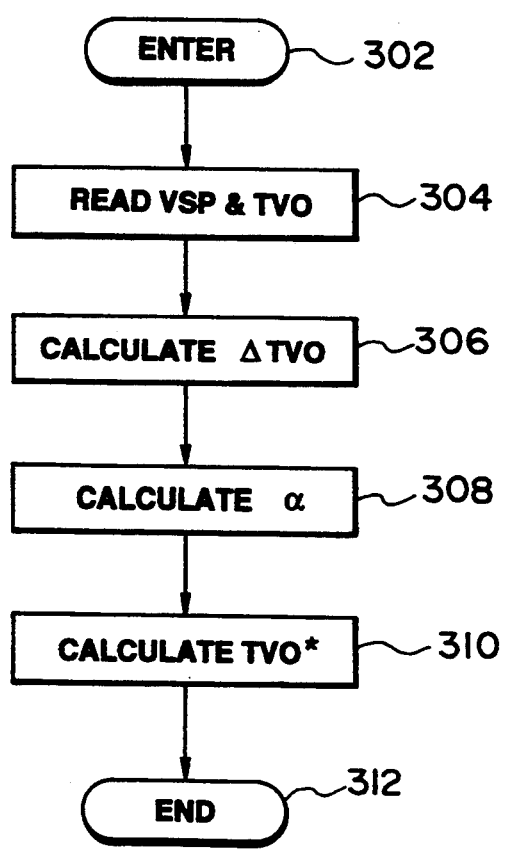
FIG. 10 is a flow diagram illustrating the programming of the digital computer used in the control unit of FIG. 7.

FIG. 10 is a flow diagram illustrating the programming of the digital computer used in the control unit of FIG. 7. The computer program is entered at the point 302 at uniform intervals of time. At the point 304 in the program, the vehicle speed VSP and the throttle angle TVO are read into the computer memory. At the point 306 in the program, the central processing unit calculates the rate ΔTVO of change of the throttle angle based upon the read throttle angle TVO by subtracting the last throttle angle value from the new throttle angle value. At the point 308 in the program, the factor $\alpha$ is set at a value equal to the slope of the approximated line as discussed in connection with FIGS. 8 and 9. At the point 310 in the program, the central processing unit calculates an estimated throttle angle TVO* as TVO* = TVO + α·ΔTVO where TVO is the read throttle angle, $\alpha$ is the calculated factor and ΔTVO is the calculated throttle angle rate of change. Following this, the program proceeds to the end point 312.

In this embodiment, an estimated throttle angle TVO* is calculated as a function of throttle angle TVO and throttle angle rate of change ΔTVO to reflect a driver's expectation for gear shift operation on the gear shift control. The estimated throttle angle TVO* is engine load information which is used, along with vehicle speed information, for gear shift control. It is, therefore, possible to make a gear shift operation in fast response to a driver's expectation for gear shift operation. Furthermore, the factor $\alpha$, which is used to calculate the estimated throttle angle TVO*, is calculated according to driver's accelerator pedal operations. It is, therefore, possible to realize an optimum gear shift operation conforming to the driver's habitual accelerator pedal operation practice.

Figure 11:
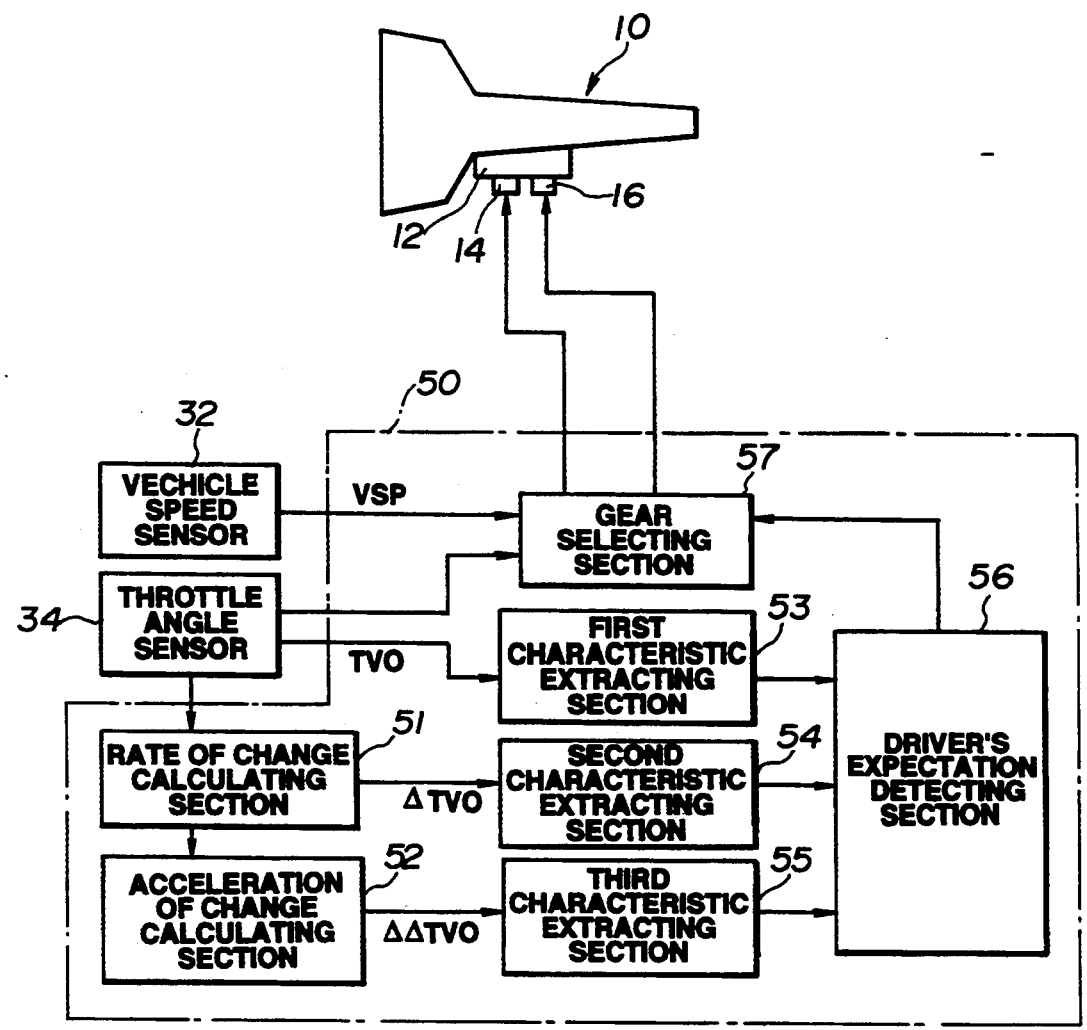
FIG. 11 is a schematic diagram showing a third embodiment of the automatic transmission apparatus of the invention.

Referring to FIG. 11, there is shown a third embodiment of the automatic transmission apparatus of the invention. The automatic transmission apparatus is intended for use with an automotive vehicle including an internal combustion engine drivingly connected to an automatic transmission 10. The automatic transmission includes a control valve unit 12 having shift solenoids 14 and 16 operable for gear shift control on command from an automatic transmission (AT) control unit 50.

The gear shift control is made based upon vehicle operating conditions including vehicle speed, throttle angle which controls the amount of air supplied to the engine, and throttle angle rate of change. Thus, a vehicle speed sensor 32 and a throttle angle sensor 34 are connected to the control unit 50. The vehicle speed sensor 32 produces an electrical signal indicative of the speed of travelling of the vehicle. The throttle angle sensor 34 produces an electrical signal indicative of the angle TVO of rotation of the throttle valve situated within the engine intake passage for controlling the amount of air permitted to enter the engine. In this invention, the engine load is inferred from the sensed throttle angle TVO. The throttle valve is connected by a mechanical linkage to an accelerator pedal (not shown). The degree to which the accelerator pedal is depressed controls the degree of rotation of the throttle valve.

The control unit 50 includes a throttle angle rate of change calculating section 51, a throttle angle acceleration of change calculating section 52, a first characteristic extracting section 53, a second characteristic extracting section 54, a third characteristic extracting section 55, a driver's expectation detecting section 56, and a gear selecting section 57. The throttle angle rate of change calculating section 51 samples the throttle angle indicative signal fed from the throttle angle sensor 34 at uniform intervals of time and calculates a difference (throttle angle rate of change) $\Delta$TVO by subtracting the last throttle angle value TVO$_{LAST}$ from the new throttle angle value TVO. The calculated throttle angle rate of change $\Delta$TVO is fed to the throttle angle acceleration of change calculating section 52 which calculates a difference $\Delta\Delta$TVO by subtracting the last throttle angle rate of change $\Delta$TVO$_{LAST}$ from the new throttle angle rate of change $\Delta$TVO. The first characteristic extracting section 53 receives the information TVO on the throttle angle from the throttle angle sensor 34 and it extracts a first characteristic from the received information TVO. The second characteristic extracting section 54 receives the information $\Delta$TVO from the throttle angle rate of change calculating section 51 and it extracts a second characteristic from the received information $\Delta$TVO. The third characteristic extracting section 55 receives the information $\Delta\Delta$TVO from the throttle angle acceleration of change calculating section 52 and it extracts a third characteristic from the received information $\Delta\Delta$TVO. The driver's expectation detecting section 56 produces a driver's expectation detection signal when the extracted first characteristic is in a first range, the extracted second characteristic is in a specified second range, and the extracted third characteristic is in a specified third range. The gear selecting section 57 receives the information on the vehicle speed VSP from the vehicle speed sensor 32 and also the information on the throttle angle TVO from the throttle angle sensor 34 and it selects an appropriate gear position based upon the vehicle speed VSP and the throttle angle TVO in the absence of the driver's expectation detection signal from the driver's expectation detecting section 56. The gear selecting section 57 operates, in response to a driver's expectation detecting signal, to select a gear position expected by the driver.

Figure 12A:
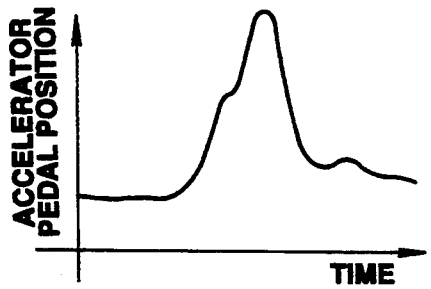
FIGS. 12A and 12B are graphs of time versus accelerator pedal position.
Figure 12B:
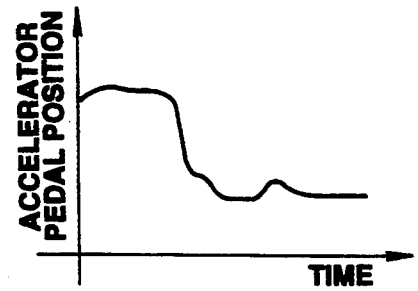

The principles of this embodiment will be described in connection with FIGS. 12A, 12B, 13A, 13B and 13C. FIGS. 12A and 12B shows accelerator pedal position change patterns produced for different driver's expectations for gear shift operation. For example, when the driver expects a down-shift operation, he will stop depressing the accelerator pedal, as indicated by the arrow in FIG. 12A. If no gear shift operation is not produced at this time, the driver will depress the accelerator pedal again to cause a gear shift operation. As a result, the accelerator pedal position change pattern has an inflection point. When the driver expects an up-shift operation, he will release the accelerator pedal to a predetermined extent and stop the accelerator pedal operation, as indicated by the arrow in FIG. 12B. If no gear shift operation is not produced at this time, the driver will release the accelerator pedal again. It can be seen that there exists a special relationship between the driver's expectation for gear shift operation and the driver's accelerator pedal operation pattern.

Figure 13A:
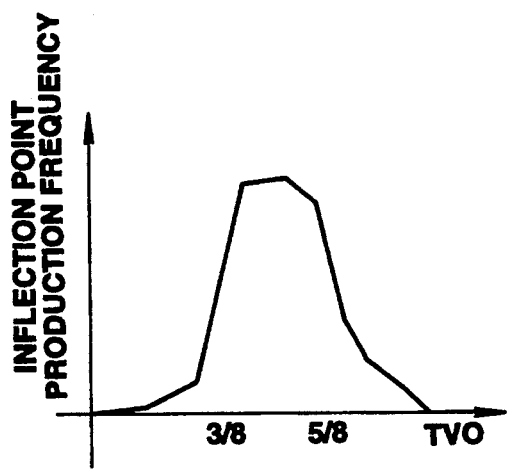
FIG. 13A is a graph of throttle angle versus inflection point production frequency.
Figure 13B:
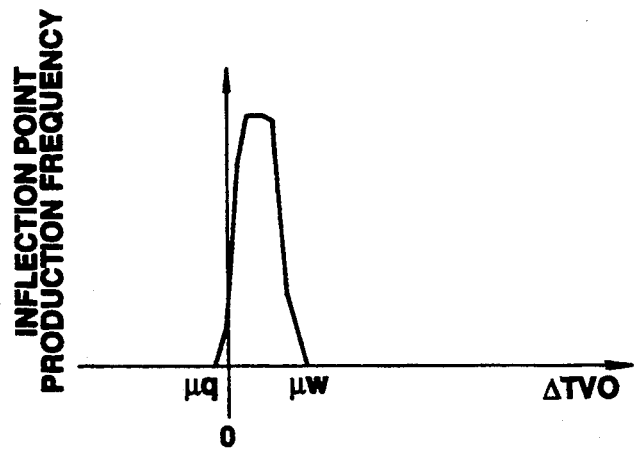
FIG. 13B is a graph of throttle angle rate of change versus inflection point production frequency.
Figure 13C:
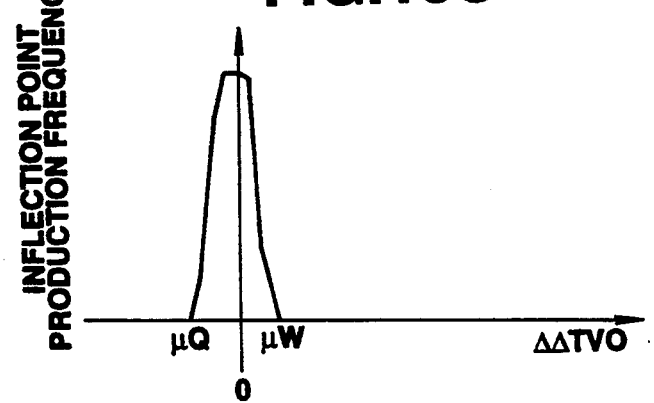
FIG. 13C is a graph of throttle angle acceleration of change versus inflection point production frequency.

It was found that the throttle angle TVO is in a range between $\frac{3}{8}$ to $\frac{5}{8}$, as shown in FIG. 13A, the throttle angle rate of change $\Delta$TVO is in a range between $\mu$q and $\mu$w, as shown in FIG. 13B, and the throttle angle acceleration of change $\Delta\Delta$TVO is in a range between $\mu$Q and $\mu$W, as shown in FIG. 13C, when the driver expects a gear shift operation. The limits of each of the specified ranges be determined by the average and standard deviation of a number of inflection points produced in connection with the driver' expectation for gear shift operation. The driver's expectation detecting section 56 is arranged to produce a driver's expectation detection signal when the throttle angle TVO is in the range between $\frac{3}{8}$ and $\frac{5}{8}$, the throttle angle rate of change $\Delta$TVO is in the range between $\mu$q and $\mu$w, and the throttle angle acceleration of change $\Delta\Delta$TVO is in the range between $\mu$Q and $\mu$W. A driver's expectation for up-shift operation is judged when the throttle angle rate of change $\Delta$TVO is positive, whereas a driver's expectation for down-shift operation is judged when the throttle angle rate of change $\Delta$TVO is negative. The gear selecting section 57 responds to the driver's expectation detection signal fed from the driver's expectation detecting section 56 by causing the control valve unit 12 to produce a gear shift operation in the automatic transmission 10 to satisfy the driver's expectation.

The control unit 50 may employ a digital computer which includes a central processing unit (CPU), a random access memory (RAM), a read only memory (ROM), and an input/output control unit (I/O). The central processing unit communicates with the rest of the computer via data bus. The input/output control circuit includes an analog-to-digital converter which converts the analog signal received from the sensors into digital form for application to the central processing unit. The read only memory contains the program for operating the central processing unit and further contains appropriate data used in detecting a driver's expectation for gear shift operation. The data may be obtained experimentally or derived empirically.

Figure 14:
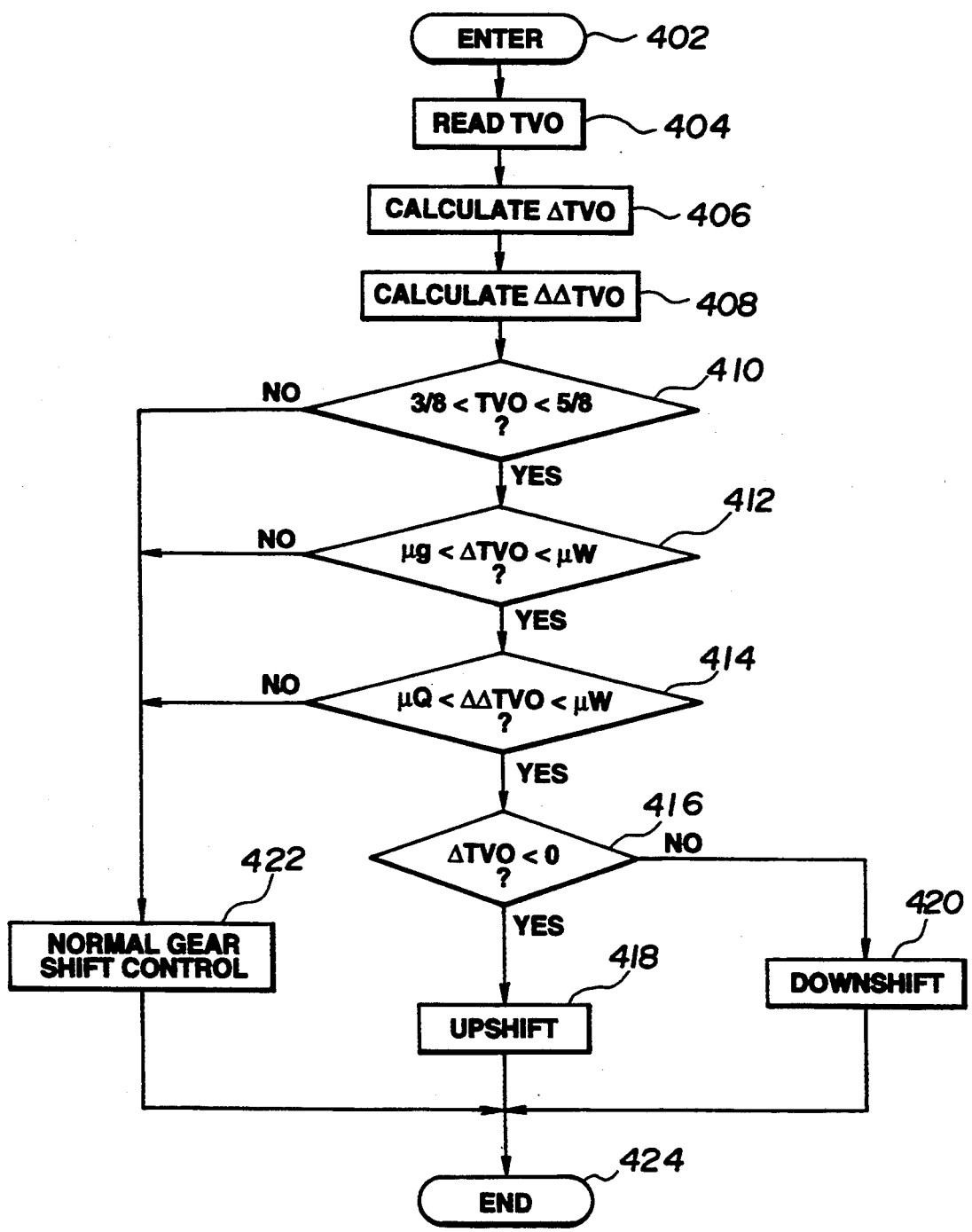
FIG. 14 is a flow diagram illustrating the programming of the digital computer used in the control unit of FIG. 11.

FIG. 14 is a flow diagram illustrating the programming of the digital computer used in the control unit of FIG. 11. The computer program is entered at the point 402 at uniform intervals of time. At the point 404 in the program, the throttle angle TVO are read into the computer memory. At the point 406 in the program, the central processing unit calculates the rate $\Delta$TVO of change of the throttle angle based upon the read throttle angle TVO by subtracting the last throttle angle value TVO$_{LAST}$ from the new throttle angle value TVO. At the point 408 in the program, the central processing unit calculates the acceleration $\Delta\Delta$TVO of change of the throttle angle based upon the calculated throttle angle rate of change $\Delta$TVO by subtracting the last throttle angle rate of change value $\Delta$TVO$_{LAST}$ from the new throttle angle rate of change value $\Delta$TVO.

At the point 410 in the program, a determination is made as to whether or not the sensed throttle angle TVO is in a first range specified therefor. If the answer to this question is "yes", then the program proceeds to the point 412. Otherwise, the program proceeds to the point 422 where the central processing unit performs a normal gear shift control which utilizes a shift pattern to calculate an appropriate gear position as a function of vehicle speed VSP and throttle angle TVO. Following this, the program proceeds to the end point 424. At the point 412 in the program, a determination is made as to whether or not the calculated throttle angle rate of change $\Delta$TVO is in a second range specified therefor. If the answer to this question is "yes", then the program proceeds to the point 414. Otherwise, the program proceeds to the point 422. At the point 414 in the program, a determination is made as to whether or not the calculated throttle angle acceleration of change $\Delta\Delta$TVO is in a third range specified therefor. If the answer to this question is "yes", then the program proceeds to the point 416. Otherwise, the program proceeds to the point 422.

At the point 416 in the program, a determination is made as to whether or not the calculated throttle angle rate of change ΔTVO is negative. If the answer to this question is "yes", then the program proceeds to the point 418 where a command is outputted to cause the control valve unit 12 to produce an up-shift operation in the automatic transmission 10. Following this, the program proceeds to the end point 424. If the calculated throttle angle rate of change ΔTVO is positive, then the program proceeds to the point 420 where a command is outputted to cause the control valve unit 12 to produce a down-shift operation in the automatic transmission 10. Following this, the program proceeds to the end point 424.

In this embodiment, the control unit 50 produces a command causing the control valve unit 12 to produce a gear shift operation expected by the driver when the throttle angle TVO is in a first range specified therefor, the throttle angle rate of change ΔTVO is in a second range specified therefor, and the throttle angle acceleration of change ΔΔTVO is in a third range specified therefor. It is, therefore, possible to make a gear shift operation in fast response to a driver's expectation for gear shift operation.

Figure 15:
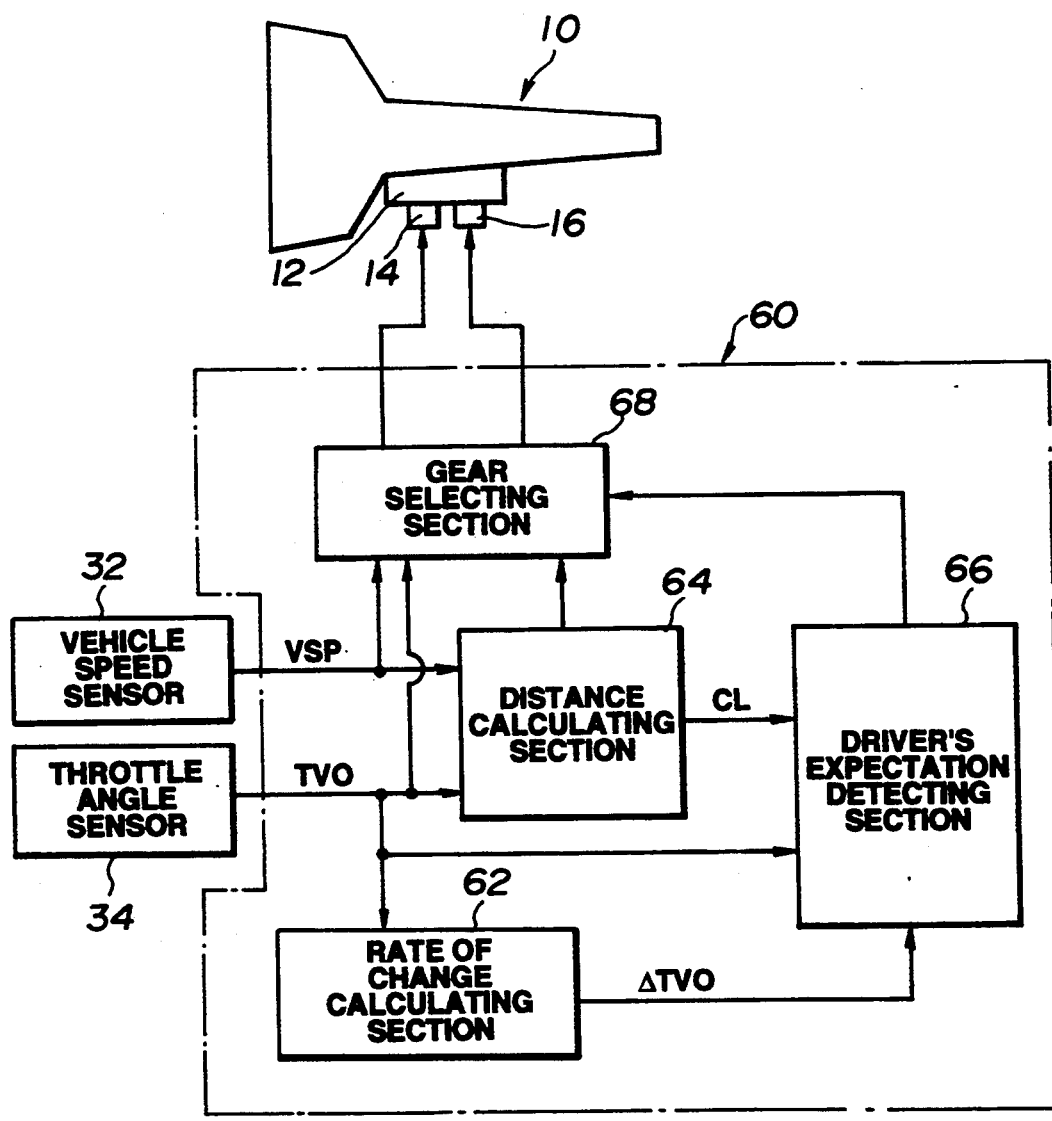
FIG. 15 is a schematic diagram showing a fourth embodiment of the automatic transmission apparatus of the invention.

Referring to FIG. 15, there is shown a fourth embodiment of the automatic transmission apparatus of the invention. The automatic transmission apparatus is intended for use with an automotive vehicle including an internal combustion engine drivingly connected to an automatic transmission 10. The automatic transmission 10 includes a control valve unit 12 having shift solenoids 14 and 16 operable for gear shift control on command from an automatic transmission (AT) control unit 60.

The gear shift control is made based upon vehicle operating conditions including vehicle speed, throttle angle which controls the amount of air supplied to the engine, and throttle angle rate of change. Thus, a vehicle speed sensor 32 and a throttle angle sensor 34 are connected to the control unit 60. The vehicle speed sensor 32 produces an electrical signal indicative of the speed of travelling of the vehicle. The throttle angle sensor 34 produces an electrical signal indicative of the angle TVO of rotation of the throttle valve situated within the engine intake passage for controlling the amount of air permitted to enter the engine. In this invention, the engine load is inferred from the sensed throttle angle TVO. The throttle valve is connected by a mechanical linkage to an accelerator pedal (not shown). The degree to which the accelerator pedal is depressed controls the degree of rotation of the throttle valve.

Figure 16:
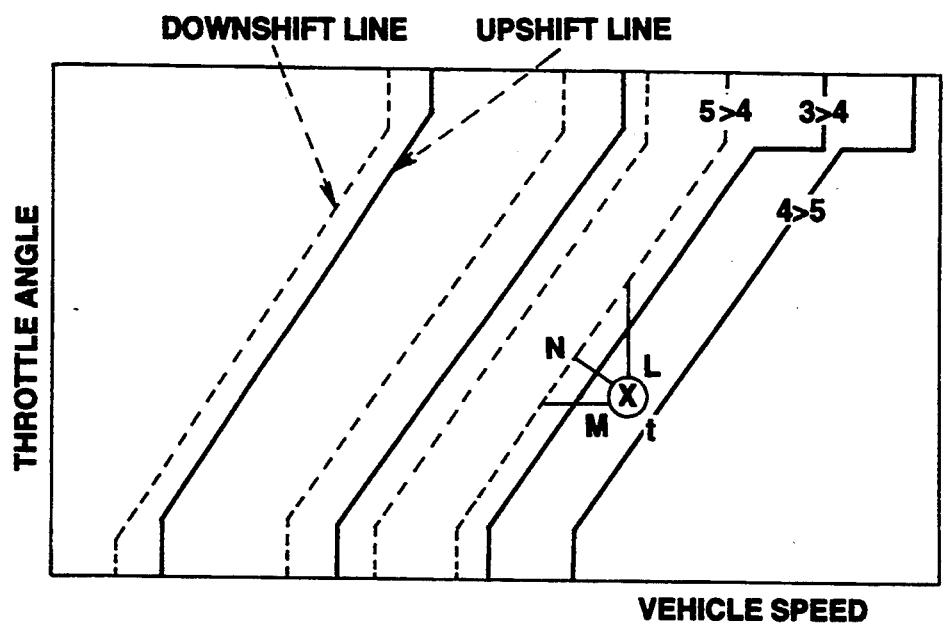
FIGS. 16 and 17 show a shift pattern used in controlling the gear shift operation made in the automatic transmission.

The control unit 60 includes a throttle angle rate of change calculating section 62, a distance calculating section 64, a driver's expectation detecting section 66, and a gear selecting section 68. The throttle angle rate of change calculating section 62 samples the throttle angle indicative signal fed from the throttle angle sensor 34 at uniform intervals of time and calculates a throttle angle rate of change ΔTVO by subtracting the last throttle angle value $TVO_{LAST}$ from the new throttle angle value TVO. The distance calculating section 64 calculates a distance CL of the point specified by the sensed vehicle speed VSP and the sensed throttle angle TVO from the gear shift line of the shift pattern (FIG. 16). The driver's expectation detecting section 66 detects an interrupt in the driver's accelerator pedal operation and produce a driver's expectation detection signal when the calculated distance is less than a predetermined value. The gear selecting section 68 receives information on the vehicle speed VSP from the vehicle speed sensor 32 and also information on the throttle angle TVO from the throttle angle sensor 34 and it selects an appropriate gear position based upon the vehicle speed VSP and the throttle angle TVO in the absence of the driver's expectation detection signal from the driver's expectation detecting section 66. The gear selecting section 68 operates, in response to a driver's expectation detecting signal, to select a gear position expected by the driver.

Figure 17:
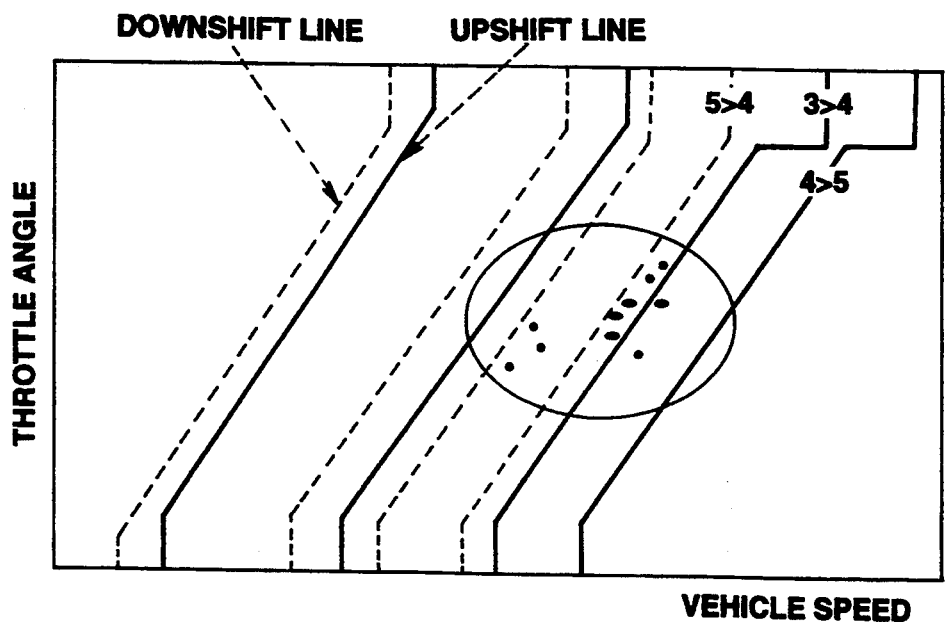

The principles of this embodiment will be described in connection with FIGS. 16 and 17. A point X is specified on the shift pattern of FIG. 16 by the vehicle speed VSP and throttle angle TVO sensed at a time t. The distance of the specified point X from the gear shift line will be referred to as estimated distance. In FIG. 16, the character N indicates the estimated distance when a 5–4 down-shift line exists near the point X specified at a time t. It is to be noted that the estimated distance may be M or N as shown in FIG. 16. To produce a gear shift operation in the automatic transmission 10, the driver is required to depress the accelerator pedal to a small extent If the estimated distance L is small and to a great extent if the estimated distance L is great. The estimated distance at a time when the point crosses the 5–4 down-shift line to produce a gear shift operation indicates the distance of the point from the 4–3 down-shift line or the 4–5 up-shift line.

For example, when the driver expects a down-shift operation, he will stop depressing the accelerator pedal, as indicated by the arrow in FIG. 12A. If no gear shift operation is not produced at this time, the driver will depress the accelerator pedal again to cause a gear shift operation. As a result, the accelerator pedal position change pattern has an inflection point. When the driver expects an up-shift operation, he will release the accelerator pedal to a predetermined extent and stop the accelerator pedal operation, as indicated by the arrow in FIG. 12B. If no gear shift operation is not produced at this time, the driver will release the accelerator pedal again. It can be seen that there exists a special relationship between the driver's expectation for gear shift operation and the driver's accelerator pedal operation pattern.

An inflection point is produced on the shift pattern each time the driver expects a gear shift operation. FIG. 17 shows the inflection points plotted on the shift pattern of FIG. 16. As can be seen from a study of FIG. 17, the inflection points are plotted near the gear shift line. This means that no gear shift operation occurs because of an insufficient degree of depression of the accelerator pedal. There exists a specified relation between the fact that an inflection point is detected and the position of the point plotted on the shift pattern. It may be considered that the driver expect a gear shift operation when an inflection point is detected and the position of the plotted point is near the gear shift line. The fact that an inflection point is produced can be detected when the throttle valve rate of change ΔTVO is almost zero. At this time, the estimated distance CL is calculated. When the estimated distance CL is less than a predetermined value, it is judged that the driver expects a gear shift operation. The driver's expectation detecting section 66 is arranged to produce a driver's expectation detection signal to the gear selection section 68 when the estimated distance CL is less than a predetermined value. A driver's expectation for up-shift operation is judged when the throttle angle rate of change ΔTVO is positive, whereas a driver's expectation for down-shift operation is judged when the throttle angle rate of change ΔTVO is negative. The gear selecting section 68 responds to the driver's expectation detection signal fed from the driver's expectation detecting section 66 by causing the control valve unit 12 to produce a gear shift operation in the automatic transmission 10 to satisfy the driver's expectation.

The control unit 60 may employ a digital computer which includes a central processing unit (CPU), a random access memory (RAM), a read only memory (ROM), and an input/output control unit (I/O). The central processing unit communicates with the rest of the computer via data bus. The input/output control circuit includes an analog-to-digital converter which converts the analog signal received from the sensors in to digital form for application to the central processing unit. The read only memory contains the program for operating the central processing unit and further contains appropriate data used in detecting a driver's expectation for gear shift operation. The data may be obtained experimentally or derived empirically.

Figure 18:
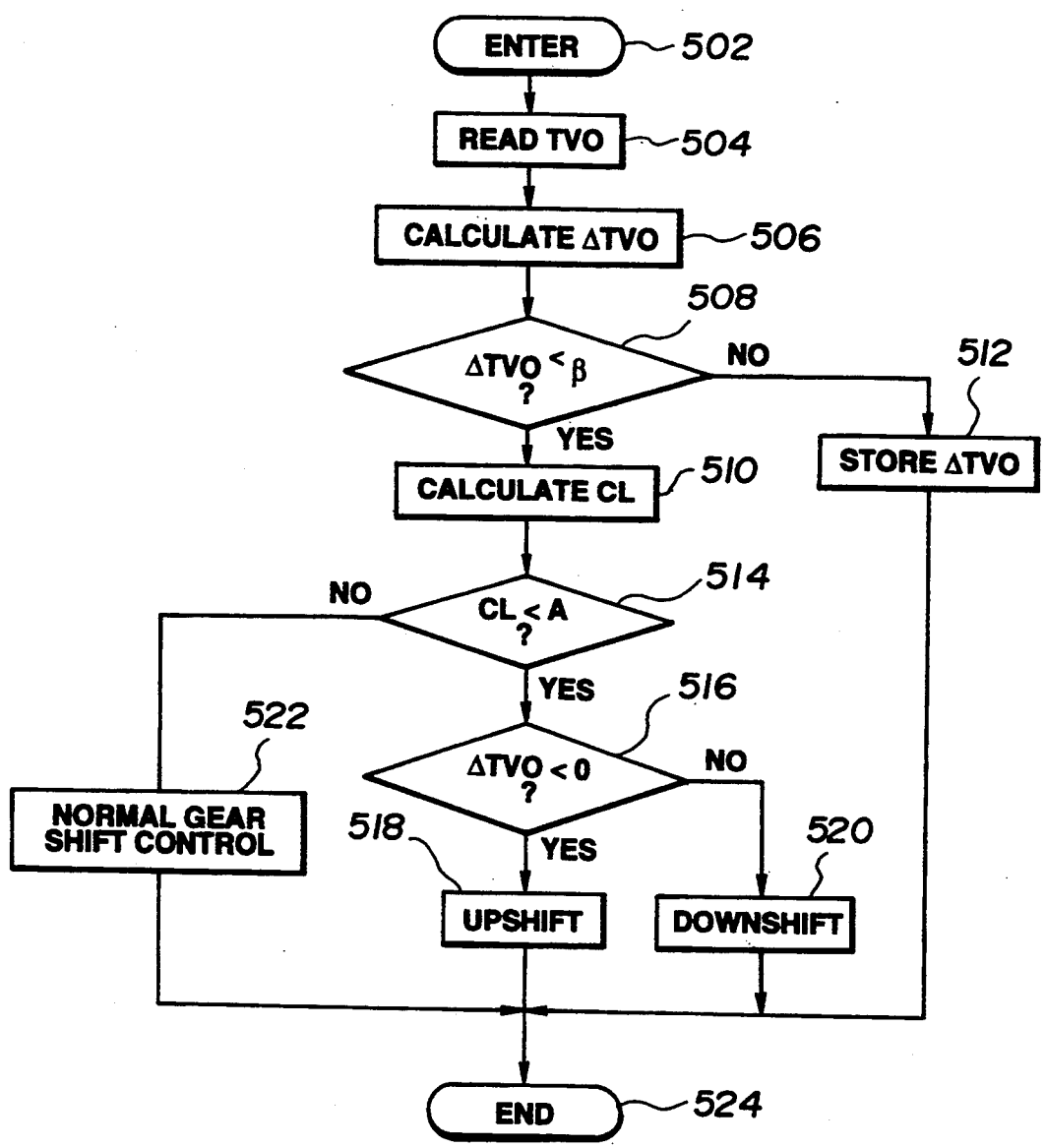
FIG. 18 is a flow diagram illustrating the programming of the digital computer used in the control unit of FIG. 15.

FIG. 18 is a flow diagram illustrating the programming of the digital computer used in the control unit of FIG. 15. The computer program is entered at the point 502 at uniform intervals of time. At the point 504 in the program, the throttle angle TVO are read into the computer memory. At the point 506 in the program, the central processing unit calculates the rate ΔTVO of change of the throttle angle based upon the read throttle angle TVO by subtracting the last throttle angle value $TVO_{LAST}$ from the new throttle angle value TVO. At the point 508 in the program, a determination is made as to whether or not the calculated throttle angle rate of change ΔTVO is equal to or less than a predetermined value β which is close to zero. If the answer to this question is "yes", then the program proceeds to the point 510. Otherwise, the program proceeds to the point 512 where the calculated throttle angle rate of change ΔTVO is stored in the computer memory and to the end point 524.

At the point 510 in the program, the estimated distance CL is calculated in such a manner as described in connection with FIGS. 16 and 17. A t the point 514 in the program, a determination is made as to whether or not the estimated distance CL is less than a predetermined value A. If the answer to this question is "yes", then the program proceeds to another determination step at the point 516. This determination is as to whether or not the calculated throttle angle rate of change ΔTVO is negative. If the answer to this question is "yes", then the program proceeds to the point 518 where a command is outputted to cause the control valve unit 12 to produce an up-shift operation in the automatic transmission 10. Following this, the program proceeds to the end point 524. If the calculated throttle angle rate of change ΔTVO is positive, then the program proceeds from the point 516 to the point 520 where a command is outputted to cause the control valve unit 12 to produce a down-shift operation in the automatic transmission 10. Following this, the program proceeds to the end point 524.

If the answer to the question inputted at the point 514 is "no", then the program proceeds to the point 522 where the central processing unit performs a normal gear shift control which utilize a shift pattern to calculate an appropriate gear position as a function of vehicle speed VSP and throttle angle TVO. Following this, the program proceeds to the end point 534.

In this embodiment, the control unit 50 produces a command causing the control valve unit 12 to produce a gear shift operation expected by the driver when the estimated distance CL is less than a predetermined value. It is, therefore, possible to make a gear shift operation in fast response to a driver's expectation for gear shift operation.

Figure 19:
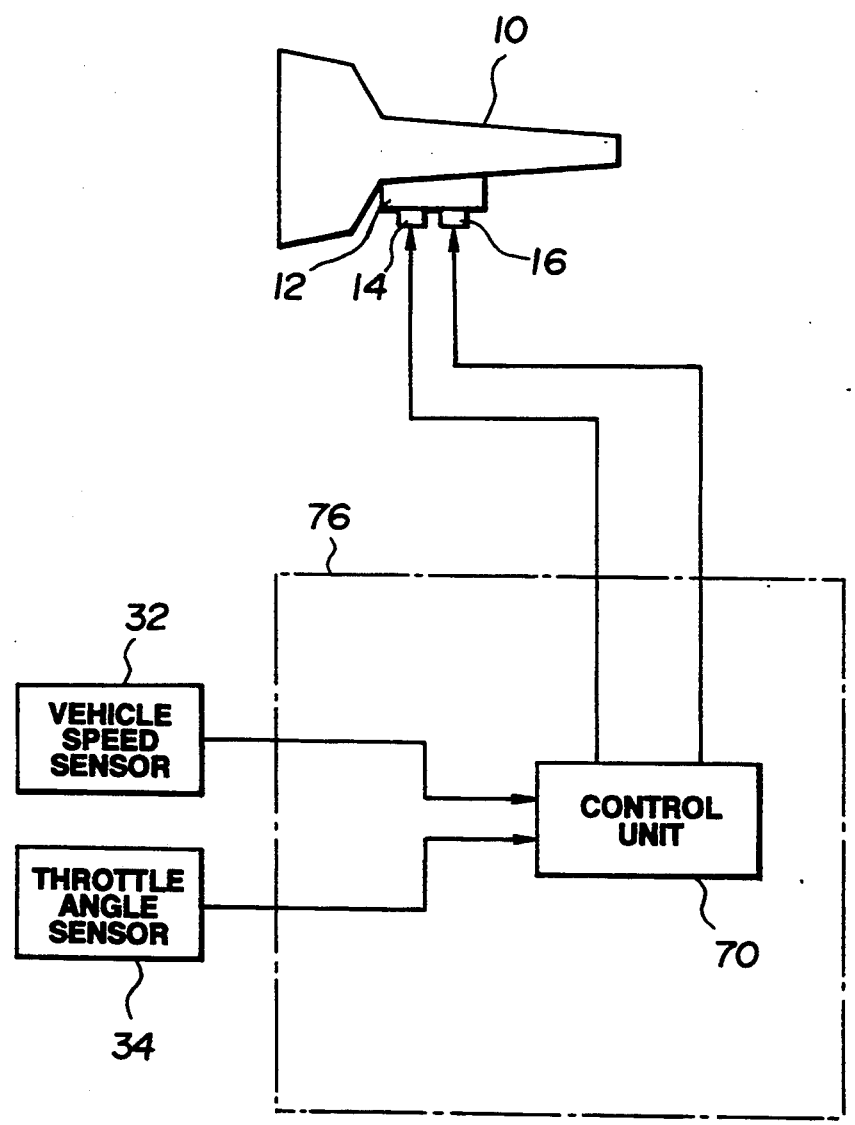
FIG. 19 is a schematic diagram showing a fifth embodiment of the automatic transmission apparatus of the invention.

Referring to FIG. 19, there is shown a fifth embodiment of the automatic transmission apparatus of the invention. The automatic transmission apparatus is intended for use with an automotive vehicle including an internal combustion engine drivingly connected to an automatic transmission 10. The automatic transmission includes a control valve unit 12 having shift solenoids 14 and 16 operable for gear shift control on command from an automatic transmission (AT) control unit 70.

The gear shift control is made based upon vehicle operating conditions including vehicle speed, throttle angle which controls the amount of air supplied to the engine, and throttle angle rate of change. Thus, a vehicle speed sensor 32 and a throttle angle sensor 34 are connected to the control unit 70. The vehicle speed sensor 32 produces an electrical signal indicative of the speed of travelling of the vehicle. The throttle angle sensor 34 produces an electrical signal indicative of the angle TVO of rotation of the throttle valve situated within the engine intake passage for controlling the amount of air permitted to enter the engine. In this invention, the engine load is inferred from the sensed throttle angle TVO. The throttle valve is connected by a mechanical linkage to an accelerator pedal (not shown). The degree to which the accelerator pedal is depressed controls the degree of rotation of the throttle valve.

The control unit 70 employs a digital computer which includes a central processing unit (CPU), a random access memory (RAM), a read only memory (ROM), and an input/output control unit (I/O). The central processing unit communicates with the rest of the computer via data bus. The input/output control circuit includes an analog-to-digital converter which converts the analog signal received from the sensors into digital form for application to the central processing unit. The read only memory contains the program for operating the central processing unit and further contains appropriate data used in detecting a driver's expectation for gear shift operation. The data may be obtained experimentally or derived empirically.

Figure 20:
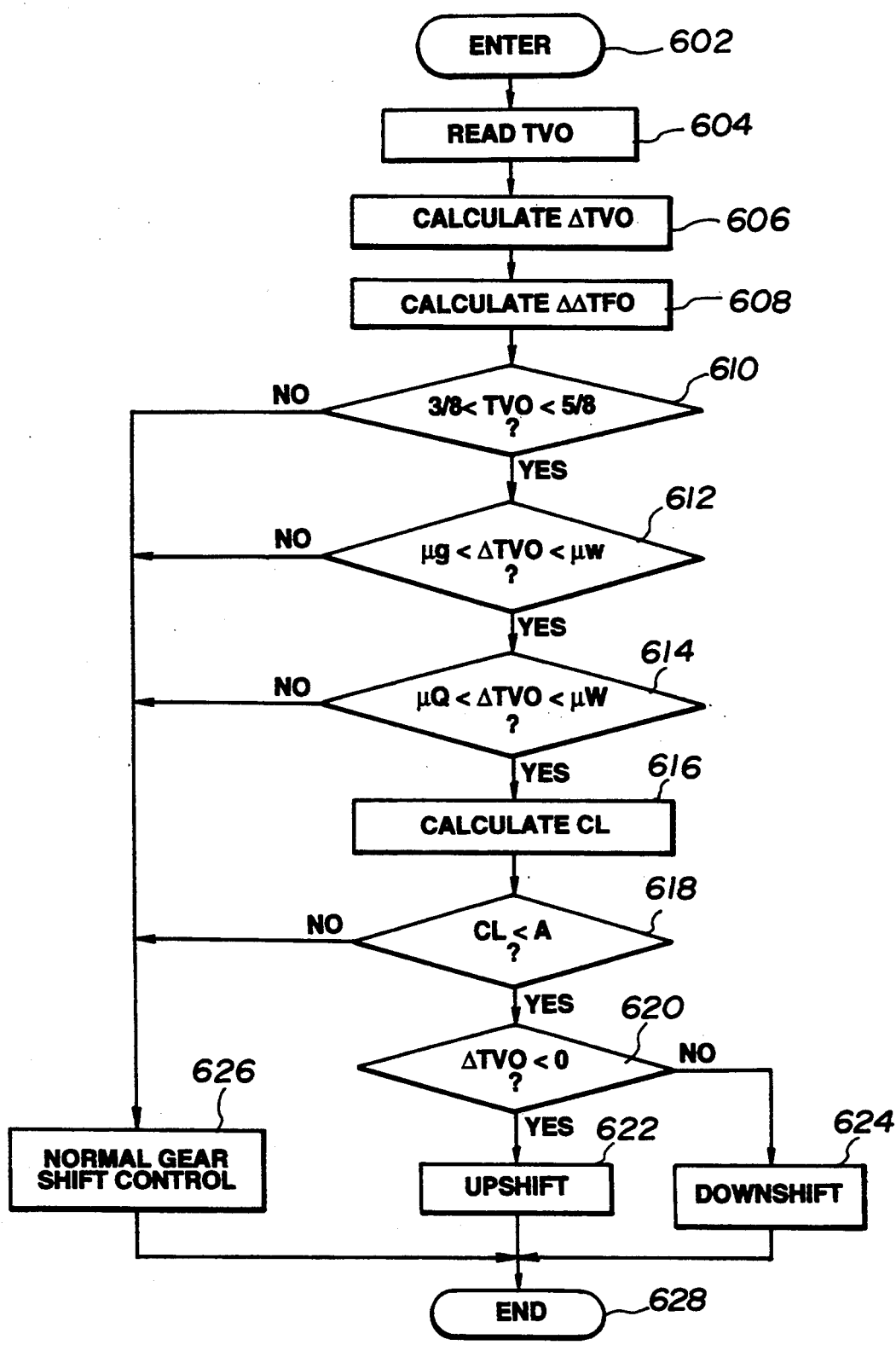
FIG. 20 is a flow diagram illustrating the programming of the digital computer used in the control unit of FIG. 19.

FIG. 20 is a flow diagram illustrating a modified form of the programming of the digital computer used in the control unit of FIG. 19. The computer program is entered at the point 602 at uniform intervals of time. At the point 604 in the program, the throttle angle TVO are read into the computer memory. At the point 606 in the program, the central processing unit calculates the rate ΔTVO of change of the throttle angle based upon the read throttle angle TVO by subtracting the last throttle angle value $TVO_{LAST}$ from the new throttle angle value TVO. At the point 608 in the program, the central processing unit calculates the acceleration ΔΔTVO of change of the throttle angle based upon the calculated throttle angle rate of change ΔTVO by subtracting the last throttle angle rate of change value $\Delta TVO_{LAST}$ from the new throttle angle rate of change value $\Delta TVO$.

At the point 610 in the program, a determination is made as to whether or not the sensed throttle angle TVO is in a first range specified therefor. If the answer to this question is "yes", then the program proceeds to the point 612. Otherwise, the program proceeds to the point 626 where the central processing unit performs a normal gear shift control which utilizes a shift pattern to calculate an appropriate gear position as a function of vehicle speed VSP and throttle angle TVO. Following this, the program proceeds to the end point 628. At the point 612 in the program, a determination is made as to whether or not the calculated throttle angle rate of change $\Delta TVO$ is in a second range specified therefor. If the answer to this question is "yes", then the program proceeds to the point 614. Otherwise, the program proceeds to the point 626. At the point 614 in the program, a determination is made as to whether or not the calculated throttle angle acceleration of change $\Delta\Delta TVO$ is in a third range specified therefor. If the answer to this question is "yes", then the program proceeds to the point 616. Otherwise, the program proceeds to the point 626.

At the point 616 in the program, the estimated distance CL is calculated in such a manner as described in connection with FIGS. 16 and 17. At the point 618 in the program, a determination is made as to whether or not the estimated distance CL is less than a predetermined value A. If the answer to this question is "yes", then the program proceeds to another determination step at the point 620. This determination is as to whether or not the calculated throttle angle rate of change $\Delta TVO$ is negative. If the answer to this question is "yes", then the program proceeds to the point 622 where a command is outputted to cause the control valve unit 12 to produce an up-shift operation in the automatic transmission 10. Following this, the program proceeds to the end point 628. If the calculated throttle angle rate of change $\Delta TVO$ is positive, then the program proceeds from the point 620 to the point 624 where a command is outputted to cause the control valve unit 12 to produce a down-shift operation in the automatic transmission 10. Following this, the program proceeds to the end point 628.

If the answer to the question inputted at the point 618 is "no", then the program proceeds to the point 626 where the central processing unit performs a normal gear shift control which utilizes a shift pattern to calculate an appropriate gear position as a function of vehicle speed VSP and throttle angle TVO. Following this, the program proceeds to the end point 628.

In this embodiment, a gear shift operation can be made in fast response to a driver's expectation for gear shift operation, as discussed in the third and fourth embodiments. Furthermore, the driver's expectation for gear shift operation can be detected with higher accuracy because of an increased number of conditions for producing a driver's expectation detection signal.

What is claimed is:

1. A gear shift control apparatus for use with an automotive vehicle having an engine and an automatic transmission to control gear shift operation in the automatic transmission, comprising:

a vehicle speed sensor sensitive to vehicle speed for producing a first sensor signal indicative of a sensed vehicle speed;

an engine load sensor sensitive to engine load for producing a second sensor signal indicative of a sensed engine load;

means responsive to the second sensor signal for calculating a rate of change of the engine load;

means for calculating an estimated engine load as a function of the sensed engine load and the calculated engine load rate of change to reflect a driver's expectation for gear shift operation on the gear shift control; and means for selecting a gear position based upon the sensed vehicle speed and the estimated engine load.

2. The gear shift control apparatus as claimed in claim 1, wherein the estimated engine load TVO* is calculated as $TVO^* = TVO + \alpha \cdot \Delta TVO$ where TVO is the sensed engine load, $\alpha$ is a factor calculated as a function of the sensed vehicle speed and the sensed engine load, and $\Delta TVO$ is the calculated engine load rate of change.

3. The gear shift control apparatus as claimed in claim 2, further including means for producing a command signal when a gear shift operation is made, and means responsive to the command signal for modifying the factor $\alpha$ to a smaller value when the calculated engine load rate of change exceeds a predetermined value and to a greater value when the sensed engine load rate of change is less than the predetermined value.

4. A gear shift control apparatus for use with an automotive vehicle having an engine and an automatic transmission to control gear shift operation in the automatic transmission, comprising:

a vehicle speed sensor sensitive to vehicle speed for producing a first sensor signal indicative of a sensed vehicle speed;

an engine load sensor sensitive to engine load for producing a second sensor signal indicative of a sensed engine load;

means responsive to the second sensor signal for calculating a rate of change of the engine load;

means for calculating an acceleration of change of the engine load;

means for producing a command signal indicative of a driver's expectation for gear shift operation when the sensed engine load is in a first range specified therefor, the calculated rate of change of the engine load is in a second range specified therefor, and the calculated acceleration of change of the engine load is in a third range specified therefor; and control means using a shift pattern to select a gear position based upon the sensed vehicle speed and engine load in the absence of the command signal, the control means being responsive to the command signal for selecting a gear position indicated by the command signal.

5. The gear shift control apparatus as claimed in claim 4, wherein the control means includes means responsive to the command signal for producing a first command to produce a down-shift operation in the automatic transmission when the calculated engine load rate of change is negative and a second command to produce an up-shift operation in the automatic transmission when the calculated engine load rate of change is positive.

6. A gear shift control apparatus for use with an automotive vehicle having an engine and an automatic transmission to control gear shift operation in the automatic transmission, comprising:

a vehicle speed sensor sensitive to vehicle speed for producing a first sensor signal indicative of a sensed vehicle speed;

an engine load sensor sensitive to engine load for producing a second sensor signal indicative of a sensed engine load;

means responsive to the second sensor signal for calculating a rate of change of the engine load;

means for producing a detection signal when an interrupt is detected in accelerator pedal depressing or releasing operation based upon the calculated engine load rate of change;

means responsive to the detection signal for producing a command signal when a distance of a position specified by sensed vehicle speed and vehicle load on a shift pattern from a gear shift line is in a predetermined range; and control means using the shift pattern to select a gear position based upon the sensed vehicle speed and engine load in the absence of the command signal, the control means being responsive to the command signal for selecting a gear position indicated by the command signal.

7. The gear shift control apparatus as claimed in claim 6, wherein the control means includes means responsive to the command signal for producing a first command to produce a down-shift operation in the automatic transmission when the calculated engine load rate of change is negative and a second command to produce an up-shift operation in the automatic transmission when the calculated engine load rate of change is positive.

8. A gear shift control apparatus for use with an automotive vehicle having an engine and an automatic transmission to control gear shift operation in the automatic transmission, comprising:

a vehicle speed sensor sensitive to vehicle speed for producing a first sensor signal indicative of a sensed vehicle speed;

an engine load sensor sensitive to engine load for producing a second sensor signal indicative of a sensed engine load;

means responsive to the second sensor signal for calculating a rate of change of the engine load;

means for calculating an acceleration of change of the engine load;

means for producing a first detection signal when the sensed engine load is in a first range specified therefor, the calculated rate of change of the engine load is in a second range specified therefor, and the calculated acceleration of change of the engine load is in a third range specified therefor;

means for producing a second detection signal when an interrupt is detected in accelerator pedal depressing or releasing operation based upon the calculated engine load rate of change;

means responsive to the second detection signal for producing a third detection signal when a distance of a position specified by sensed vehicle speed and vehicle load on a shift pattern from a gear shift line is in a predetermined range;

means for producing a command signal in the presence of the first and third detection signals; and control means using a shift pattern to select a gear position based upon the sensed vehicle speed and engine load in the absence of the command signal, the control means being responsive to the command signal for selecting a gear position indicated by the command signal.

9. The gear shift control apparatus as claimed in claim 8, wherein the control means includes means responsive to the command signal for producing a first command to produce a down-shift operation in the automatic transmission when the calculated engine load rate of change is negative and a second command to produce an up-shift operation in the automatic transmission when the calculated engine load rate of change is positive.

* * * * *